United States Patent
Hashimoto

(10) Patent No.: US 10,457,372 B2
(45) Date of Patent: Oct. 29, 2019

(54) PROPULSION DEVICE FOR SHIP

(71) Applicant: Yanmar Co., Ltd., Osaka-shi, Osaka-fu (JP)

(72) Inventor: Yuji Hashimoto, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/064,996

(22) PCT Filed: Dec. 21, 2016

(86) PCT No.: PCT/JP2016/088217
§ 371 (c)(1),
(2) Date: Jun. 21, 2018

(87) PCT Pub. No.: WO2017/110928
PCT Pub. Date: Jun. 29, 2017

(65) Prior Publication Data
US 2019/0016432 A1    Jan. 17, 2019

(30) Foreign Application Priority Data

Dec. 22, 2015 (JP) .................. 2015-250530

(51) Int. Cl.
*B63H 23/30* (2006.01)
*B63H 23/08* (2006.01)
(Continued)

(52) U.S. Cl.
CPC ............ *B63H 23/30* (2013.01); *B63H 23/08* (2013.01); *F16D 41/04* (2013.01); *F16H 3/14* (2013.01);
(Continued)

(58) Field of Classification Search
None
See application file for complete search history.

(56) References Cited

U.S. PATENT DOCUMENTS

| | | | | |
|---|---|---|---|---|
| 1,953,486 A | * | 4/1934 | Kiep | ............... B63H 23/20 477/2 |
| 2,427,135 A | * | 9/1947 | Guier | ............... F16H 3/00 474/4 |

(Continued)

FOREIGN PATENT DOCUMENTS

| | | |
|---|---|---|
| JP | 59-038197 A | 3/1984 |
| JP | 4836836 B2 | 10/2011 |

(Continued)

OTHER PUBLICATIONS

International Search Report dated Mar. 7, 2017 issued in corresponding PCT Application PCT/JP2016/088217 cites the patent documents above.

*Primary Examiner* — Colby M Hansen
(74) *Attorney, Agent, or Firm* — Norton Rose Fulbright US LLP

(57) ABSTRACT

A propulsion device for a ship capable of preventing idling of a propeller without any limitation on the type of clutch. The propulsion device includes: a forward and reverse switching clutch for transmitting the driving power from an input shaft to a forward gear or a reverse gear; a forward one-way clutch, disposed between the input shaft and the forward gear, for connecting the forward gear and the input shaft when the forward gear is rotated at a higher speed than that of the input shaft; and a reverse one-way clutch, disposed between the input shaft and the reverse gear, for connecting the reverse gear and the input shaft when the reverse gear is rotated at a higher speed than that of the input shaft.

1 Claim, 10 Drawing Sheets

(51) Int. Cl.
   *F16H 3/14*    (2006.01)
   *F16D 41/04*   (2006.01)
   *B63B 35/00*   (2006.01)
   *F16D 41/00*   (2006.01)
   *B63H 5/07*    (2006.01)
   *B63H 23/20*   (2006.01)

(52) U.S. Cl.
   CPC ........ *B63B 2035/009* (2013.01); *B63H 23/20* (2013.01); *B63H 2005/075* (2013.01); *F16D 41/00* (2013.01)

(56) References Cited

U.S. PATENT DOCUMENTS 2,742,798 A * 4/1956 Niederhauser ......... B63H 23/20
                                                     74/364
2013/0312559 A1  11/2013 Tanaka et al.

FOREIGN PATENT DOCUMENTS

JP    2013-244833 A    12/2013
JP    2014-148265 A     8/2014

* cited by examiner

→ : DIRECTION IN WHICH IT IS ROTATING

⇨ : DIRECTION IN WHICH IT TENDS TO BE ROTATED

CLUTCH: N

CLUTCH: F

CLUTCH: R

PROPELLER:
IDLING IN DIRECTION
FOR FORWARD
MOVEMENT

PROPELLER:
IDLING IN DIRECTION
FOR REARWARD
MOVEMENT

→ : DIRECTION IN WHICH IT IS ROTATING

⇨ : DIRECTION IN WHICH IT TENDS TO BE ROTATED

PROPULSION DEVICE FOR SHIP

CROSS REFERENCES TO RELATED APPLICATIONS

This application is a national stage application pursuant to 35 U.S.C. § 371 of International Application No. PCT/JP2016/088217, filed on Dec. 21, 2016, which claims priority under 35 U.S.C. § 119 to Japanese Patent Application No. 2015-250530, filed on Dec. 22, 2015, the disclosures of which are hereby incorporated by reference in their entireties.

TECHNICAL FIELD

The present invention relates to a propulsion device for a ship.

BACKGROUND ART

Patent Literature 1 (hereinafter, referred to as PTL 1) discloses a propulsion device including a hydraulic forward and reverse switching clutch for transmitting a rotation direction of an input shaft to a propeller shaft, the clutch being capable of changing the rotation direction between forward and reverse relative to the input shaft. This propulsion device includes: the input shaft drivably connected to an engine; an output shaft including the propeller shaft; and a hydraulic wet multiplate clutch, positioned between the input shaft and the output shaft, for switching forward and reverse propulsion of the output shaft.

CITATION LIST

Patent Literature

PTL 1: Japanese Patent No. 4836836

SUMMARY OF INVENTION

Technical Problem

Since the clutch employed in the propulsion device described in PTL 1 is a hydraulic type, the clutch is not in a connected state while the engine is stopped. Therefore, in some cases, it may be impossible to prevent idling of the propeller which may occur when the ship moves due to, e.g., a wind force or towing.

In order to deal with this, some aspects of the present invention have an object to provide a propulsion device for a ship, the propulsion device being capable of preventing idling of a propeller without any limitation on the type of clutch.

Solution to Problem

A propulsion device for a ship according to an aspect of the present invention includes: an input shaft connected to a driving source; a forward gear provided on the input shaft; a reverse gear provided on the input shaft; an output gear engaged with the forward gear and the reverse gear; an output shaft configured to receive driving power transmitted from the output gear; a forward and reverse switching clutch configured to transmit driving power from the input shaft to the forward gear or the reverse gear; a forward one-way clutch disposed between the input shaft and the forward gear, the forward one-way clutch connecting the forward gear and the input shaft to each other in a case where the forward gear is rotated at a higher speed than a speed at which the input shaft is rotated; and a reverse one-way clutch disposed between the input shaft and the reverse gear, the reverse one-way clutch connecting the reverse gear and the input shaft to each other in a case where the reverse gear is rotated at a higher speed than a speed at which the input shaft is rotated.

Advantageous Effects of Invention

With the propulsion device for the ship according to the aspect of the present invention, it is possible to prevent idling of the propeller.

DESCRIPTION OF EMBODIMENTS

Figure 1:
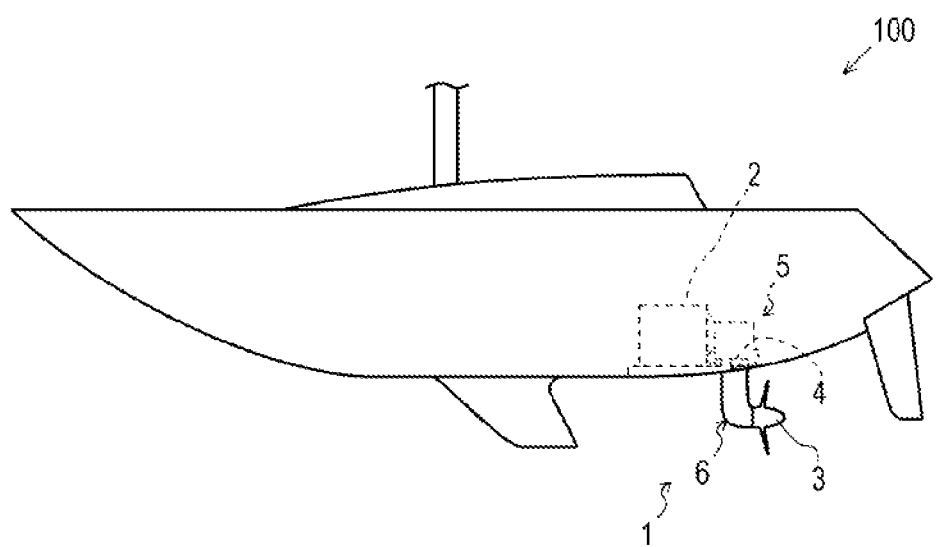
FIG. 1 is a side view of a ship provided with a propulsion device.

With reference to FIG. 1, the following will describe a ship 100 provided with a propulsion device 1. The propulsion device will be described below with an axis direction of a propeller shaft 15 or an output shaft 54, each of which serves as an output shaft (described later), being defined as a front-and-rear direction, a side on which an engine 2 (described later) is disposed being defined as the front, and a side on which a propeller shaft 3 is disposed being defined as the rear.

The propulsion device is configured to allow driving power from the engine 2, which is a driving source, to be transmitted to the propeller 3, which is attached to a downstream end of a power transmission path of the propulsion device 1, to rotate the propeller 3 to propel the ship 100. The propulsion device 1 is disposed such that a part of the propulsion device 1 protrudes downward through an opening 4 in the bottom of the ship 100.

Figure 2:
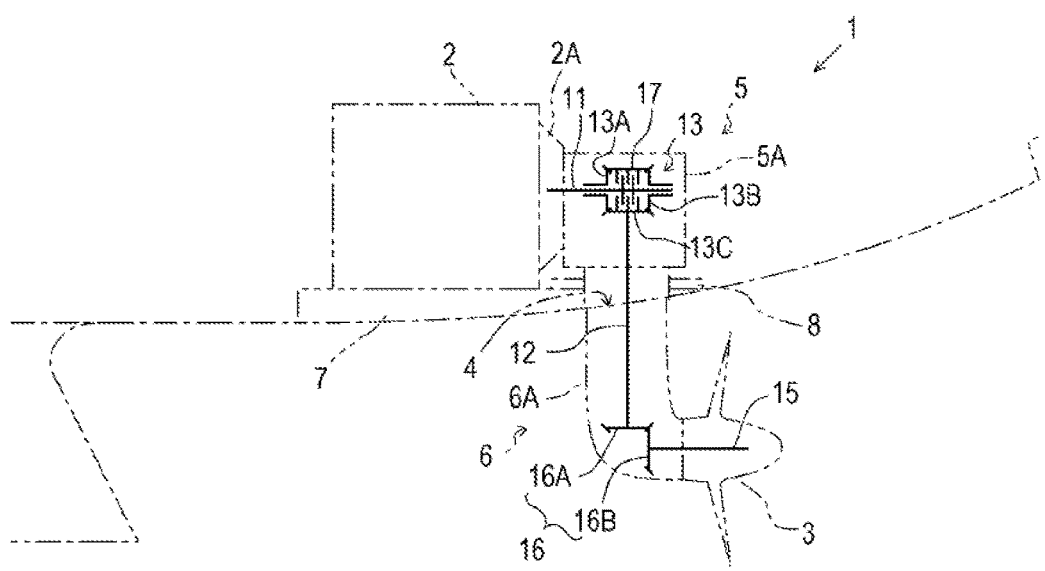
FIG. 2 is an enlarged view of the propulsion device illustrated in FIG. 1.
Figure 3:
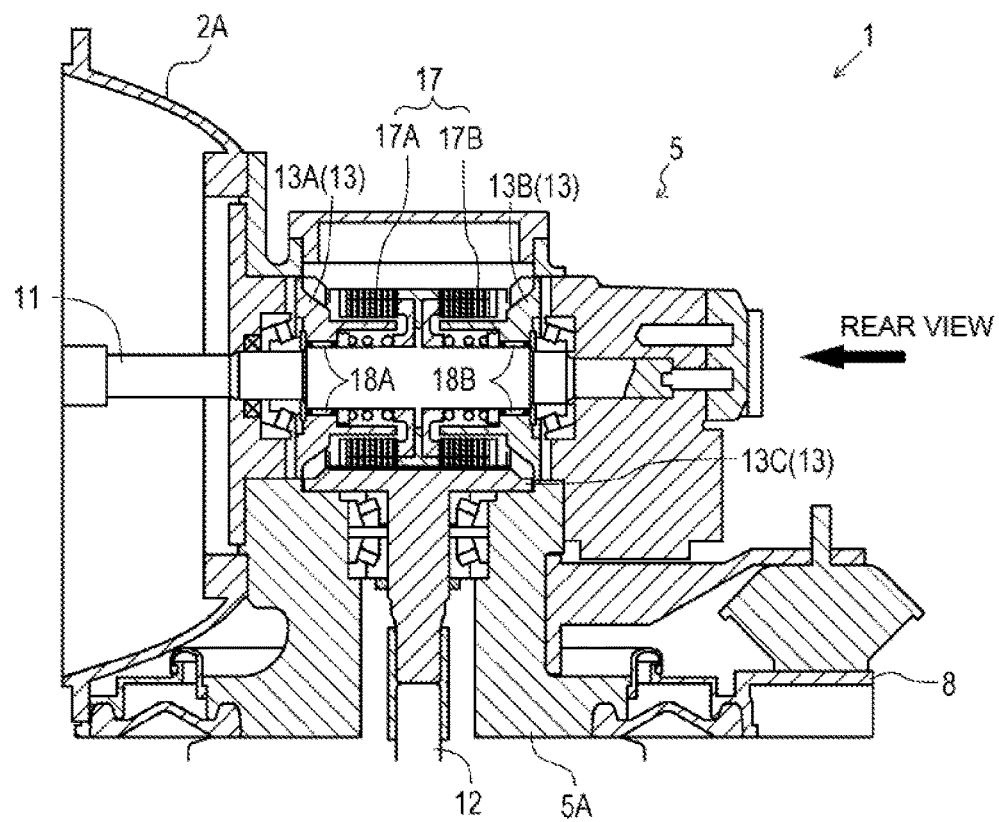
FIG. 3 is a cross-sectional view of a part of the propulsion device, the part being inside the ship.

With reference to FIGS. 1 to 3, an overall configuration of the propulsion device 1 will be described.

The propulsion device 1 includes an upper unit 5 positioned inside the ship and a lower unit 6 extending downward from the opening. The upper unit 5 has a front portion connected to a flywheel housing 2A of the engine 2 and a lower portion connected to the lower unit 6 extending downward through the opening 4.

An engine bed 7 is disposed around the opening 4 in the bottom of the ship, and is integrated with the ship body. The engine bed 7 has an upper portion to which a vibration insulator for installation of the propulsion device 1 is fixed. To the vibration insulator, a seal flange 8 for supporting the upper unit 5 and the engine 2, to which the propulsion device 1 is fastened, are attached.

As described above, the propulsion device 1 is connected to the engine 2, and is disposed inside and outside of the ship through the opening 4 in the bottom of the ship.

The upper unit 5 includes an input shaft 11 connected to the engine 2, a part of an intermediate shaft 12 extending from the upper unit 5 to the lower unit 6 such that the intermediate shaft 12 is penetrated through the upper unit 5 and the lower unit 6, a gear mechanism 13 for transmitting driving power from the input shaft 11 to the intermediate shaft 12, a unit clutch 17 for connecting or disconnecting driving power transmission from the input shaft 11 to the intermediate shaft 12, and an upper housing 5A accommodating the input shaft 11, the part of the intermediate shaft 12, the gear mechanism 13, and the unit clutch 17.

The lower unit 6 includes a part of the intermediate shaft 12, the propeller shaft 15 having one end to which the propeller 3 is fixed, a gear mechanism 16 for transmitting driving power from the intermediate shaft 12 to the propeller shaft 15, and a lower housing 6A accommodating the part of the intermediate shaft 12, the propeller shaft 15, and the gear mechanism 16.

Driving power from the engine 2 is transmitted to the input shaft 11 in the upper unit 5. The driving power transmitted to the input shaft 11 is transmitted to the intermediate shaft 12 via the gear mechanism 13. The driving power transmitted to the intermediate shaft 12 via the gear mechanism 13 is transmitted to the propeller shaft 15 via the gear mechanism 16 (gears 16A and 16B), which is disposed at a lower end of the intermediate shaft 12. The driving power transmitted to the propeller shaft 15 rotates the propeller 3, which is disposed at the one end of the propeller shaft 15. Consequently, the ship 100 is propelled.

As described above, the propulsion device 1 is configured to allow driving power to be transmitted from the input shaft 11, which is connected to the driving source, to the output shaft (the intermediate shaft 12 and the propeller shaft 15) via the gear mechanisms.

With reference to FIG. 3, the following will describe an internal configuration of the upper unit 5.

The input shaft 11 is disposed such that a longitudinal direction of the input shaft 11 coincides with the front-and-rear direction and the input shaft 11 extends rearward from the engine 2. The input shaft 11 has one end connected to the engine 2 in the flywheel housing 2A of the engine 2.

The gear mechanism 13 is constituted by bevel gears. The gear mechanism 13 includes a forward gear 13A, a reverse gear 13B, and an output gear 13C. The forward gear 13A and the reverse gear 13B, which are included in the gear mechanism 13 and serve as a first gear, are provided on the input shaft 11, and are connected to the unit clutch 17. The output gear 13C, which is included in the gear mechanism 13 and serves as a second gear, is engaged with the forward gear 13A and the reverse gear 13B.

The input shaft 11, on which the forward gear 13A and the reverse gear 13B of the gear mechanism 13 are provided, is provided with the unit clutch 17 for connecting or disconnecting driving power from the engine 2. The unit clutch 17 is a forward and reverse switching clutch including a wet multiplate clutch. The unit clutch 17 includes a forward clutch 17A and a reverse clutch 17B. The forward clutch 17A is connectable to the forward gear 13A, which is included in the gear mechanism 13. The reverse clutch 17B is connectable to the reverse gear 13B, which is included in the gear mechanism 13.

The intermediate shaft 12 is disposed such that a longitudinal direction of the intermediate shaft 12 coincides with a top-and-bottom direction and the intermediate shaft 12 is penetrated through a lower portion of the upper unit 5. The intermediate shaft 12 has an upper end connected to the output gear 13C so that the output gear 13C and the intermediate shaft 12 are rotated integrally.

In the above configuration, actuating the forward clutch 17A or the reverse clutch 17B enables driving power transmission from the input shaft 11 to the forward gear 13A or from the input shaft 11 to the reverse gear 13B.

Figure 4:
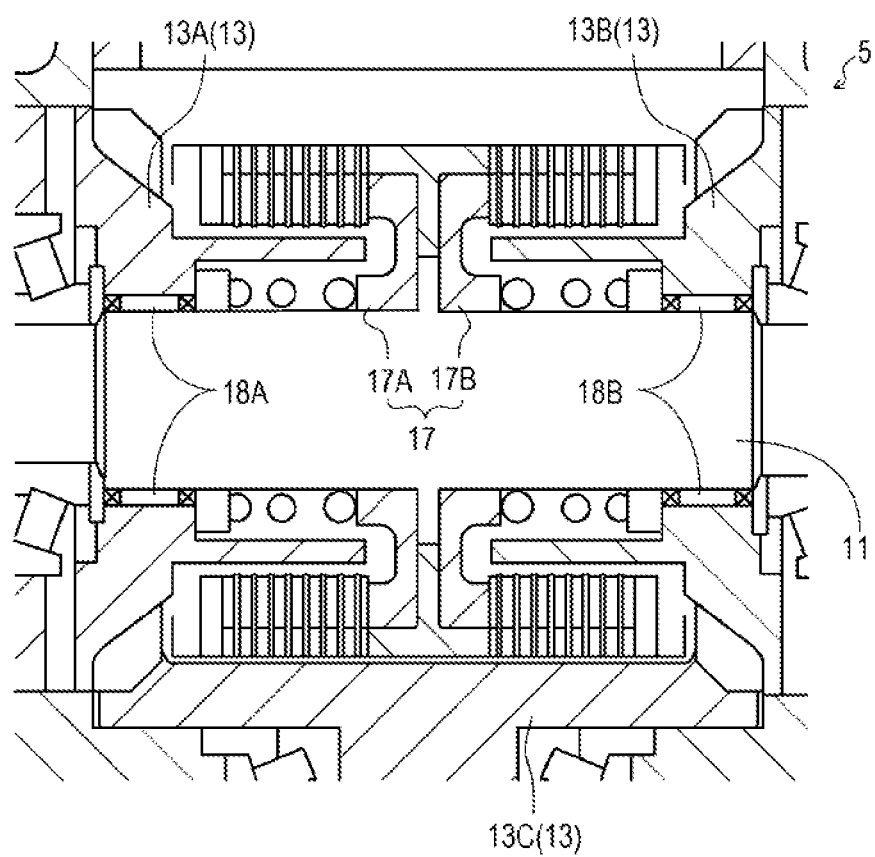
FIG. 4 is an enlarged view of a part of FIG. 3, the part illustrating a structure of gears supporting an input shaft.

As illustrated in FIG. 4, the gears (the forward gear 13A, the reverse gear 13B) included in the gear mechanism 13 and provided on the input shaft 11 are connected to the input shaft 11 via a forward one-way clutch 18A and a reverse one-way clutch 18B, respectively.

The forward one-way clutch 18A and the reverse one-way clutch 18B each have a substantially cylindrical shape. In addition, the forward one-way clutch 18A and the reverse one-way clutch 18B are respectively attached to the forward gear 13A and the reverse gear 13B by being pressed thereinto. The forward one-way clutch 18A and the reverse one-way clutch 18B each have a center portion in its axial direction that functions as a clutch and both edges in the axial direction that function as bearings.

Each of the forward one-way clutch 18A and the reverse one-way clutch 18B is actuated in a case where its corresponding shaft or gear related to the output shaft (the propeller shaft 15) is rotated at a higher speed than a speed at which the shaft or gear related to the input shaft 11 is rotated. The actuation herein refers to a state in which the shaft or gear corresponding to the forward one-way clutch 18A or the reverse one-way clutch 18B and being related to the output shaft becomes engageable (capable of power transmission) with the shaft or gear related to the input shaft 11. Each of the forward one-way clutch 18A and the reverse one-way clutch 18B is not actuated in a case where its corresponding shaft or gear related to the output shaft (the propeller shaft 15) is rotated at a lower speed than a speed at which the shaft or gear related to the input shaft 11 that is being driven by the engine 2 is rotated or in a case where its corresponding shaft or gear related to the output shaft (the propeller shaft 15) is rotated in a direction opposite to a direction in which the shaft or gear related to the input shaft 11 that is being driven by the engine 2 is rotated.

Figure 5A:
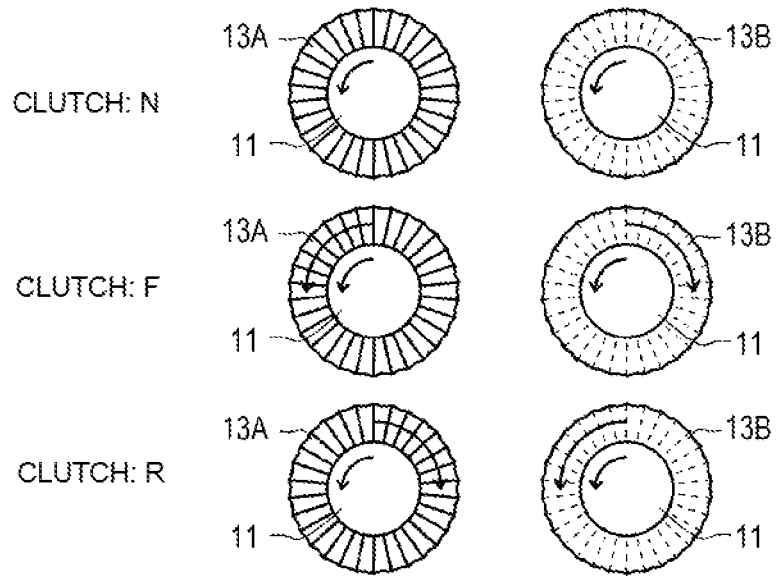
FIG. 5A illustrates whether or not the input shaft and the gears are rotated while the engine is driving as well as rotation directions thereof if they are rotated.
Figure 5B:
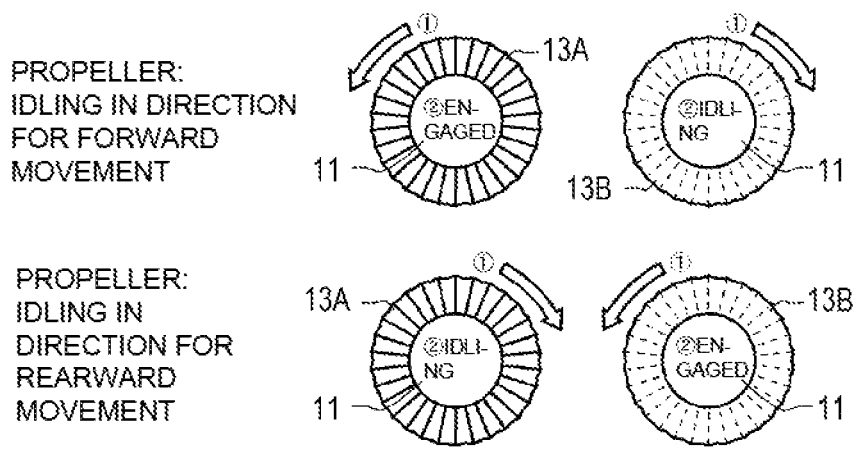
FIG. 5B illustrates whether or not the input shaft and the gears are rotated while a propeller is idling as well as rotation directions thereof if they are rotated.

With reference to FIGS. 5A and 5B, the following will describe whether or not the forward gear 13A, the reverse gear 13B, and the input shaft 11 are rotated while the engine 2 is driving and the propeller 3 is idling as well as rotation directions thereof if they are rotated. FIGS. 5A and 5B schematically illustrate the input shaft 11, the forward gear 13A, and the reverse gear 13B in a rear view.

In a state where the engine 2 is driving and the unit clutch 17 is at a neutral position, only the input shaft 11 is rotated in a direction (counterclockwise in FIGS. 5A and 5B) identical to a direction in which the engine 2 is rotated, and the forward one-way clutch 18A and the reverse one-way clutch 18B are not actuated, so that the forward gear 13A and the reverse gear 13B are not rotated.

In a state where the engine 2 is driving and the unit clutch 17 is at a forward position, the unit clutch 17 is connected to the forward gear 13A. Along with rotation of the input shaft 11, the forward gear 13A is rotated, via the unit clutch 17, in a direction identical to a direction in which the input shaft 11 is rotated. Meanwhile, the reverse gear 13B is not connected to the unit clutch 17. Consequently, along with rotation of the output gear 13C, the reverse gear 13B is rotated in a direction opposite to the direction in which the input shaft 11 is rotated. Since the reverse gear 13B is rotated in the direction opposite to the direction in which the input shaft 11 is rotated, the reverse one-way clutch 18B is not actuated and thus the reverse gear 13B may idle.

In a state where the engine 2 is driving and the unit clutch 17 is at a reverse position, the unit clutch 17 is connected to the reverse gear 13B. Along with rotation of the input shaft 11, the reverse gear 13B is rotated, via the unit clutch 17, in a direction identical to a direction in which the input shaft 11 is rotated. Meanwhile, the forward gear 13A is not connected to the unit clutch 17. Consequently, along with rotation of the output gear 13C, the forward gear 13A is rotated in a direction opposite to the direction in which the input shaft 11 is rotated. Since the forward gear 13A is rotated in the direction opposite to the direction in which the input shaft 11 is rotated, the forward one-way clutch 18A is not actuated and thus the forward gear 13A may idle.

The following will describe what will happen while the propeller 3 is idling.

The idling herein refers to a state in which the propeller 3 is rotated by a stream of water coming from the front or the rear when the ship 100 moves forward or rearward due to, e.g., a wind force or towing, regardless of whether the engine 2 is driving or stopped or whether the unit clutch 17 is in a connected state or not. The following will describe whether or not the forward gear 13A, the reverse gear 13B, and the input shaft 11 are rotated while the engine 2 is stopped and the propeller 3 is idling as well as rotation directions thereof if they are rotated.

While the engine 2 is stopped and the propeller 3 tends to be rotated in a direction for forward movement, the forward gear 13A tends to be rotated counterclockwise. When the forward gear 13A tends to be rotated counterclockwise, the forward one-way clutch 18A is actuated, so that the forward gear 13A and the input shaft 11 are engaged with each other (capable of transmitting power therebetween). The engagement between the forward gear 13A and the input shaft 11 provides a state in which driving power can be transmitted from the engine 2 to the propeller 3 in an integrated manner. Thus, since the input shaft 11 is not rotated while the engine 2 is stopped, the propeller 3 is locked by a resistance force of the engine 2. Consequently, it is possible to prevent idling of the propeller 3.

While the engine 2 is stopped and the propeller 3 tends to be rotated in a direction for rearward movement, the reverse gear 13B tends to be rotated counterclockwise. When the reverse gear 13B tends to be rotated counterclockwise, the reverse one-way clutch 18B is actuated, so that the reverse gear 13B and the input shaft 11 are engaged with each other (become capable of transmitting power therebetween). The engagement between the reverse gear 13B and the input shaft 11 provides a state in which driving power can be transmitted from the engine 2 to the propeller 3 in an integrated manner. Thus, since the input shaft 11 is not rotated while the engine 2 is stopped, the propeller 3 is locked by a resistance force of the engine 2. Consequently, it is possible to prevent idling of the propeller 3.

As described above, by connecting the gear (the forward gear 13A, the reverse gear 13B) included in the gear mechanism 13 to the input shaft 11 via the forward one-way clutch 18A or the reverse one-way clutch 18B, it is possible to prevent idling of the propeller 3.

By preventing idling of the propeller 3, it is possible to prevent a noise that may otherwise be generated by rotation of the shaft and/or the gear connected to the propeller 3 and/or to the propeller shaft 15 in the propulsion device 1. In addition, by preventing idling of the propeller 3, it is possible to prevent damages such as wear and/or seizure on the components that may otherwise be caused by rolling and/or sliding of the components occurring while a pump for constantly supplying lubrication oil in the propulsion device 1 is stopped. Furthermore, by preventing idling of the propeller 3, it is possible to prevent an obstacle in water such as rope and/or a net from winding around the propeller 3. Moreover, by preventing idling of the propeller 3, it is possible to reduce the possibility that the propeller 3 may cause a damage on a person in water.

As described above, the above configuration can prevent idling of the propeller 3 regardless of whether the unit clutch 17 is in a connected state or not. Therefore, any type of unit clutch 17, e.g., either a hydraulic type unit clutch 17 or a mechanical type unit clutch 17, can be used in the propulsion device 1

According to the present embodiment, the forward one-way clutch 18A and the reverse one-way clutch 18B are applied to the configuration in which the gears included in the gear mechanism 13 are disposed on the output side of the unit clutch 17. However, the configuration to which the one-way clutches are applied is not limited to such a configuration. Alternatively, for example, one-way clutches 38A and 38B may be applied to a configuration described in another embodiment in which gears included in a gear mechanism 33 are disposed on the input side of a unit clutch 37. The following will describe the configuration in which the gears included in the gear mechanism 33 support an intermediate shaft 32 via the one-way clutches 38A and 38B.

Figure 6:
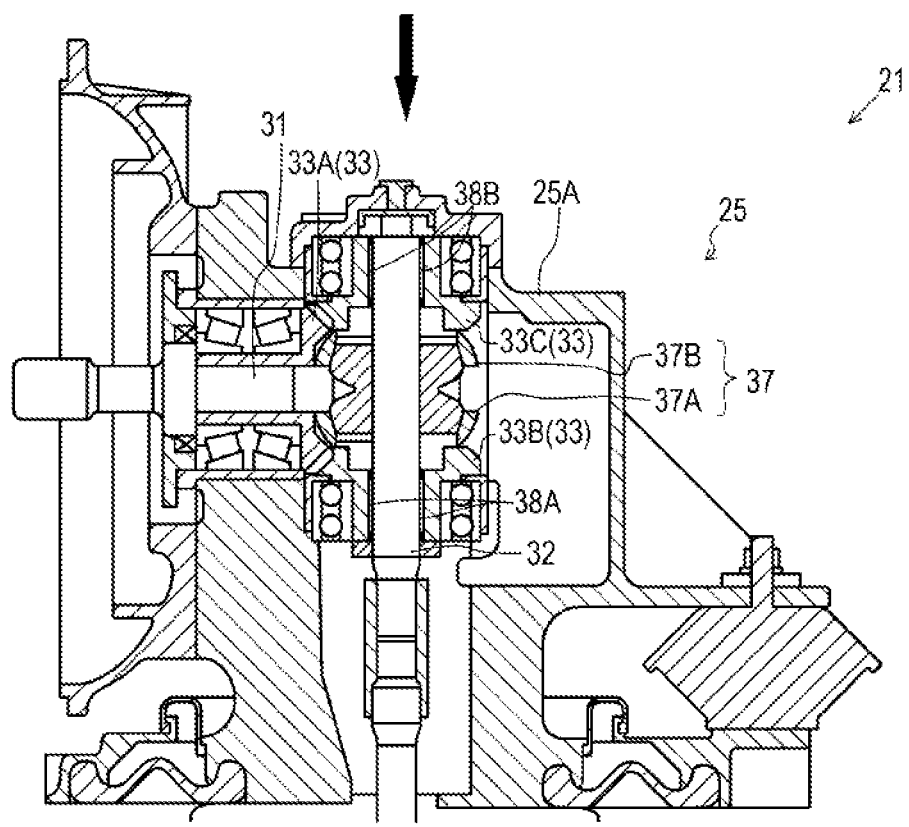
FIG. 6 is a cross-sectional view of a part of a propulsion device according to a second embodiment.

With reference to FIG. 6, the following will describe a propulsion device 21 according to another embodiment.

The propulsion device 21 includes an upper unit 25 positioned inside a ship and a lower unit extending downward through an opening. The upper unit 25 has a front portion connected to a flywheel housing 2A of an engine 2 and a lower portion connected to the lower unit extending downward through an opening 4.

The upper unit 25 includes an input shaft 31 connected to the engine 2, a part of the intermediate shaft 32 extending from the upper unit 25 to the lower unit such that the intermediate shaft 32 is penetrated through the upper unit 25 and the lower unit, the gear mechanism 33 for transmitting driving power from the input shaft 31 to the intermediate shaft 32, the unit clutch 37 for connecting or disconnecting driving power transmission from the input shaft 31 to the intermediate shaft 32, and an upper housing 25A accommodating the input shaft 31, the part of the intermediate shaft 32, the gear mechanism 33, and the unit clutch 37.

The gear mechanism 33 is constituted by bevel gears. The gear mechanism 33 includes a gear 33A, a forward gear 33B, and a reverse gear 33C. The gear 33A, which is included in the gear mechanism 33, is provided on the input shaft 11 such that the gear 33A is engaged with the forward gear 33B and the reverse gear 33C. The forward gear 33B and the reverse gear 33C are provided on the intermediate shaft 32, and are connected to the unit clutch 37.

The input shaft 31 is disposed such that a longitudinal direction of the input shaft 31 coincides with the front-and-rear direction and the input shaft 31 extends rearward from the engine 2. The input shaft 31 has one end connected to the engine 2 in the flywheel housing 2A of the engine 2. The input shaft 31 has the other end connected to the gear 33A, which is included in the gear mechanism, so that the gear 33A and the input shaft 31 are rotated integrally.

On the intermediate shaft 32, the unit clutch 37 for connecting or disconnecting driving power from the engine 2 is provided. The unit clutch 37 is a forward and reverse switching clutch. The unit clutch 37 includes a forward clutch 37A and a reverse clutch 37B. The forward clutch 37A is connectable to the forward gear 33B, which is included in the gear mechanism 33. The reverse clutch 37B is connectable to the reverse gear 33C, which is included in the gear mechanism 33.

In the above configuration, actuating the forward clutch 37A or the reverse clutch 37B allows driving power to be transmitted from the forward gear 33B to the intermediate shaft 32 or from the reverse gear 33C to the intermediate shaft 32.

As illustrated in FIG. 6, the gears (the forward gear 33B, the reverse gear 33C) included in the gear mechanism 33 and are provided on the intermediate shaft 32 are supported by the upper housing 25A through bearings, and support the intermediate shaft 32 via the one-way clutches 38A and 38B.

The one-way clutches 38A and 38B each have a substantially cylindrical shape. In addition, the one-way clutches 38A and 38B are respectively attached to the forward gear 33B and the reverse gear 33C by being pressed thereinto. The one-way clutches 38A and 38B each have a center portion in its axial direction that functions as a clutch and both edges in the axial direction that function as bearings.

Each of the one-way clutches 38A and 38B is actuated in a case where its corresponding shaft or gear related to an output shaft (propeller shaft) is rotated at a higher speed than a speed at which the shaft or gear related to the input shaft 31 is rotated. The actuation herein refers to a state in which the shaft or gear corresponding to the one-way clutch 38A or 38B and being related to the output shaft becomes engageable (capable of power transmission) with the shaft or gear related to the input shaft 31. Each of the one-way clutches 38A and 38B is not actuated in a case where its corresponding shaft or gear related to the output shaft is rotated at a lower speed than a speed at which the shaft or gear related to the input shaft 31 that is being driven by the engine 2 is rotated or in a case where its corresponding shaft or gear related to the output shaft is rotated in a direction opposite to a direction in which the shaft or gear related to the input shaft 31 that is being driven by the engine 2 is rotated.

Figure 7A:
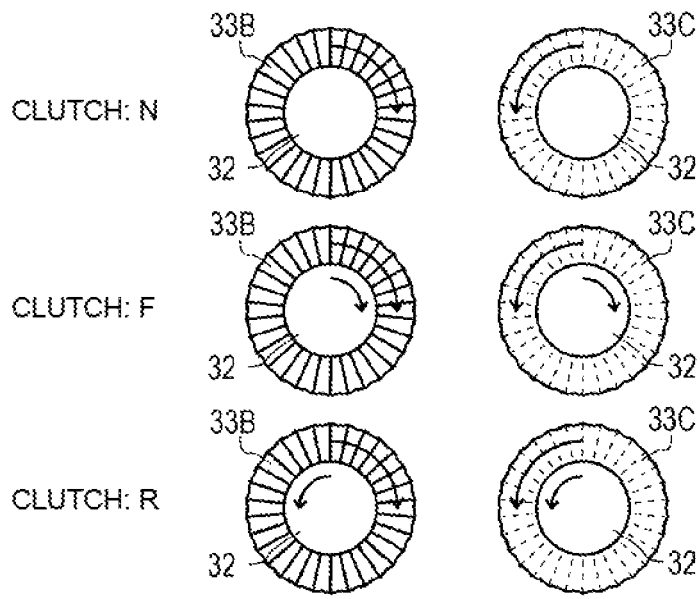
FIG. 7A illustrates whether or not gears and an intermediate shaft are rotated while an engine is driving as well as rotation directions thereof if they are rotated.
Figure 7B:
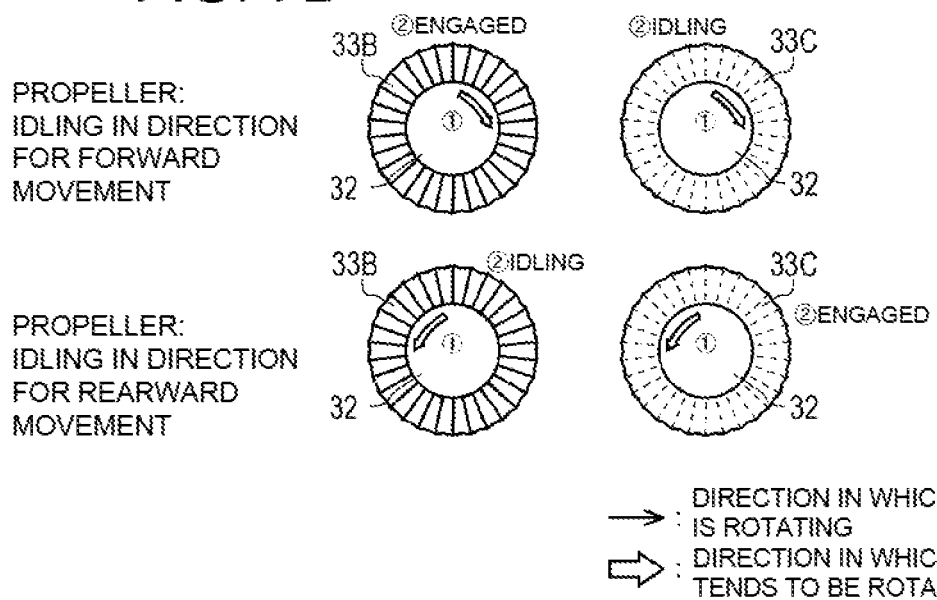
FIG. 7B illustrates whether or not the gears and the intermediate shaft are rotated during idling as well as rotation directions thereof if they are rotated.

With reference to FIGS. 7A and 7B, the following will describe whether or not the forward gear 33B, the reverse gear 33C, and the intermediate shaft 32 are rotated while the engine 2 is driving and the propeller 3 is idling as well as rotation directions thereof if they are rotated. FIGS. 7A and 7B schematically illustrate the intermediate shaft 32, the forward gear 33B, and the reverse gear 33C in a top view.

In a state where the engine 2 is driving and the unit clutch 37 is at a neutral position, the one-way clutches 38A and 38B are not actuated. Consequently, the forward gear 33B is rotated in a direction (clockwise in FIGS. 7A and 7B) identical to that of the forward gear 33B being driven by the engine 2, and the reverse gear 33C is rotated in a direction (counterclockwise in FIGS. 7A and 7B) identical to that of the reverse gear 33C being driven by the engine 2.

In a state where the engine 2 is driving and the unit clutch 37 is at a forward position, the unit clutch 37 is connected to the forward gear 33B. Along with rotation of the forward gear 33B, the intermediate shaft 32 is rotated, via the unit clutch 37, in a direction identical to a direction in which the forward gear 33B is rotated. Meanwhile, the reverse gear 33C is not connected to the unit clutch 37. Consequently, along with rotation of the gear 33A, the reverse gear 33C is rotated in a direction opposite to the direction in which the forward gear 33B and the intermediate shaft 32 are rotated. During this, the one-way clutch 38B is not actuated, and thus the reverse gear 33C may idle.

In a state where the engine 2 is driving and the unit clutch 37 is at a reverse position, the unit clutch 37 is connected to the reverse gear 33C. Along with rotation of the reverse gear 33C, the intermediate shaft 32 is rotated, via the unit clutch 37, in a direction identical to a direction in which the reverse gear 33C is rotated. Meanwhile, the forward gear 33B is not connected to the unit clutch 37. Consequently, along with rotation of the gear 33A, the forward gear 33B is rotated in a direction opposite to the direction in which the reverse gear 33C and the intermediate shaft 32 are rotated. During this, the one-way clutch 38A is not actuated, and thus the forward gear 33B may idle.

The following will describe whether or not the forward gear 33B, the reverse gear 33C, and the intermediate shaft 32 are rotated while the propeller 3 is idling as well as rotation directions thereof if they are rotated.

While the engine 2 is stopped and the propeller 3 tends to be rotated in a direction for forward movement, the intermediate shaft 32 tends to be rotated clockwise. When the intermediate shaft 32 tends to be rotated clockwise, the one-way clutch 38A is actuated. Consequently, the intermediate shaft 32 and the forward gear 33B are engaged with each other (become capable of transmitting power therebetween). The engagement between the intermediate shaft 32 and the forward gear 33B provides a state in which driving power can be transmitted from the engine 2 to the propeller 3 in an integrated manner. Thus, since the intermediate shaft 32 is not rotated while the engine 2 is stopped, the propeller 3 is locked by a resistance force of the engine 2. Consequently, it is possible to prevent idling of the propeller 3.

While the engine 2 is stopped and the propeller 3 tends to be rotated in a direction for rearward movement, the intermediate shaft 32 tends to be rotated counterclockwise. When the intermediate shaft 32 tends to be rotated counterclockwise, the one-way clutch 38B is actuated. Consequently, the intermediate shaft 32 and the reverse gear 33C are engaged with each other (become capable of transmitting power therebetween). The engagement between the intermediate shaft 32 and the reverse gear 33C provides a state in which driving power can be transmitted from the engine 2 to the propeller 3 in an integrated manner. Thus, since the intermediate shaft 32 is not rotated while the engine 2 is stopped, the propeller 3 is locked by a resistance force of the engine 2. Consequently, it is possible to prevent idling of the propeller 3.

Even with the gears of the gear mechanism 33 being connected to the output shaft (the intermediate shaft 32) via the one-way clutches 38A and 38B, it is possible to prevent idling of the propeller 3. This is because that the one-way clutch 38 is configured to be actuated when the shaft or gear related to the output shaft is rotated at a higher speed than a speed at which the shaft or gear related to the input shaft 31 is rotated, and consequently a state in which driving power can be transmitted from the engine 2 to the propeller 3 in an integrated manner can be achieved.

Figure 8:
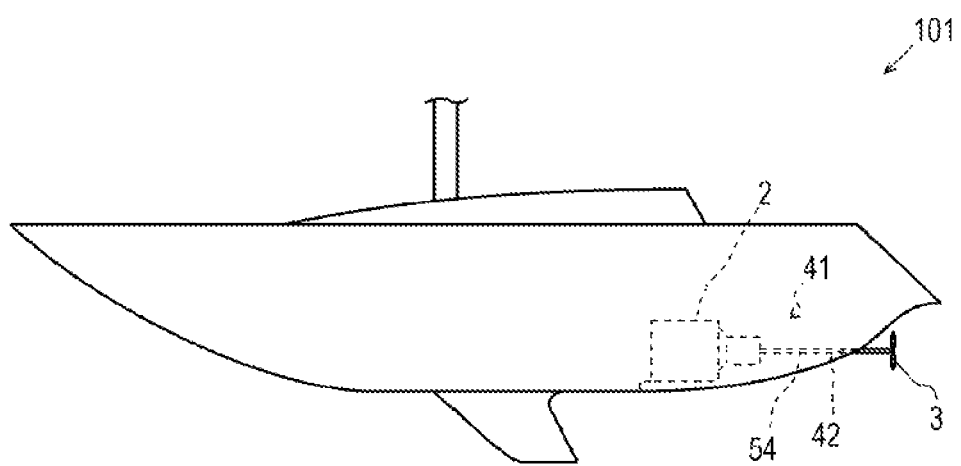
FIG. 8 is a side view of a ship provided with a propulsion device according to a third embodiment.
Figure 9A:
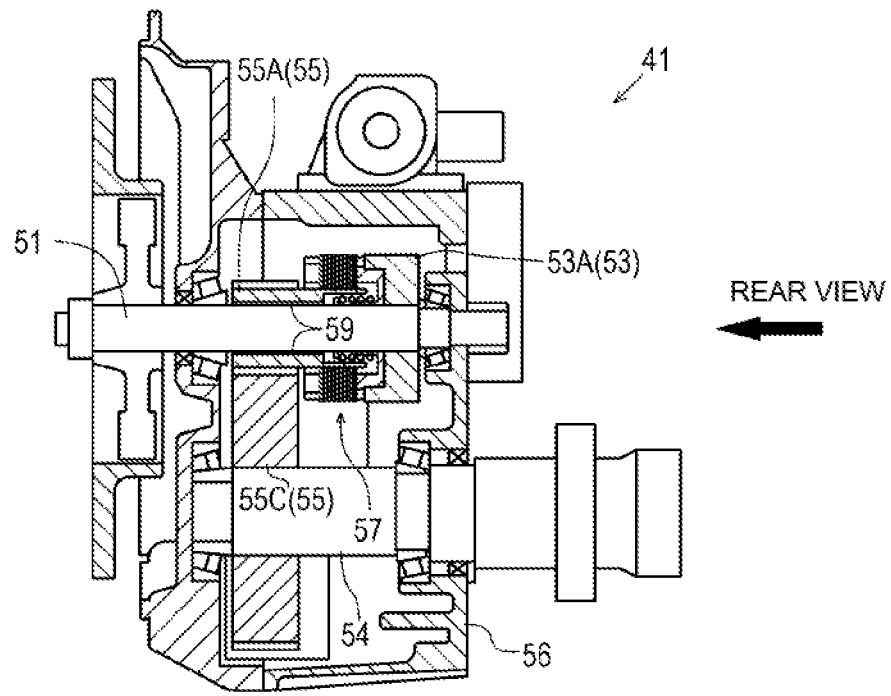
FIG. 9A is a cross-sectional view of a part of the propulsion device, the part including an input shaft and an output shaft.
Figure 9B:
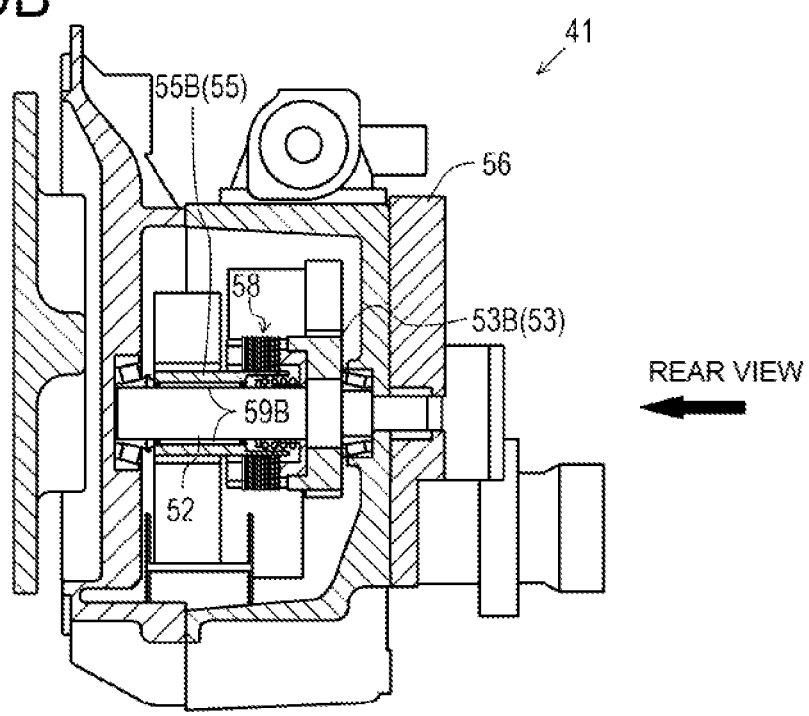
FIG. 9B is a cross-sectional view of a part of the propulsion device, the part including a reverse drive shaft.

In the propulsion device of the above embodiment, the gear mechanism is constituted by the bevel gears. However, the gear mechanism is not limited to such a configuration. With reference to FIGS. 8 through 9B, the following will describe a propulsion device including a gear mechanism constituted by cylindrical gears.

A propulsion device 41 is configured to allow driving power from an engine 2, which is a driving source, to be transmitted to a propeller 3, which is attached to a downstream end of a power transmission path of the propulsion device 41, to rotate the propeller 3 to propel a ship 101. The propulsion device 41 is positioned inside the ship, and includes an output shaft 54 to which the propeller 3 is fixed and which extends substantially rearward through an opening 42 in the bottom of the ship 101.

The propulsion device 41 includes an input shaft 51 connected to the engine 2, a reverse drive shaft 52 disposed in parallel with the input shaft 51, a gear mechanism 53 for transmitting driving power from the input shaft 51 to the reverse drive shaft 52, the output shaft 54 that is disposed in parallel with the input shaft 51 and has one end to which the propeller 3 is fixed, a gear mechanism 55 for transmitting driving power from the input shaft 51 to the output shaft 54 or from the reverse drive shaft 52 to the output shaft 54, and a housing 56 accommodating the input shaft 51, the reverse drive shaft 52, the output shaft 54, and the gear mechanisms 53 and 55.

The input shaft 51 is disposed such that a longitudinal direction of the input shaft 51 coincides with the front-and-rear direction. The input shaft 51 has one end connected to the engine 2 and the other end to which a cylindrical gear 53A, which is included in the gear mechanism 53, is fixed. The input shaft 51 has an intermediate portion provided with the unit clutch 57 for connecting or disconnecting driving power transmission to the output shaft 54. The unit clutch 57 is connected to a cylindrical gear 55A, which is included in the gear mechanism 55.

The reverse drive shaft 52 is disposed such that a longitudinal direction of the reverse drive shaft 52 coincides with the front-and-rear direction. The reverse drive shaft 52 has the other end to which a cylindrical gear 53B, which is included in the gear mechanism 53, is fixed. The cylindrical gear 53B is engaged with the cylindrical gear 53A. The reverse drive shaft 52 has an intermediate portion and one end, between which a unit clutch 58 for connecting or disconnecting driving power transmission to the output shaft 54 is interposed. The unit clutch 58 is connected to a cylindrical gear 55B, which is included in the gear mechanism 55.

The output shaft 54 is disposed such that a longitudinal direction of the output shaft 54 coincides with the front-and-rear direction. The output shaft 54 has one end to which a cylindrical gear 55C, which is included in the gear mechanism 55, is fixed. The output shaft 54 is penetrated through the housing 56, and has the other end to which the propeller 3 is fixed. The cylindrical gear 55C is engaged with the cylindrical gears 55A and 55B.

In the above configuration, driving power from the engine 2 is transmitted to the input shaft 51 in the housing 56. When the unit clutch 57 is connected to the cylindrical gear 55A, driving power is transmitted from the input shaft 51 to the output shaft 54, so that the output shaft 54 is rotated in a forward direction. Consequently, the ship 101 is propelled forward.

When the unit clutch 58 is connected to the cylindrical gear 55B, driving power transmitted from the input shaft 51 to the reverse drive shaft 52 via the gear mechanism 53 is transmitted to the output shaft 54 via the gear mechanism 55, so that the output shaft 54 is rotated in a reverse direction. Consequently, the ship 101 is propelled rearward.

As described above, the propulsion device 41 is configured to allow driving power to be transmitted from the input shaft 51 (including the reverse drive shaft), which is connected to the driving source, to the output shaft 54 via the gear mechanisms.

Figure 10A:
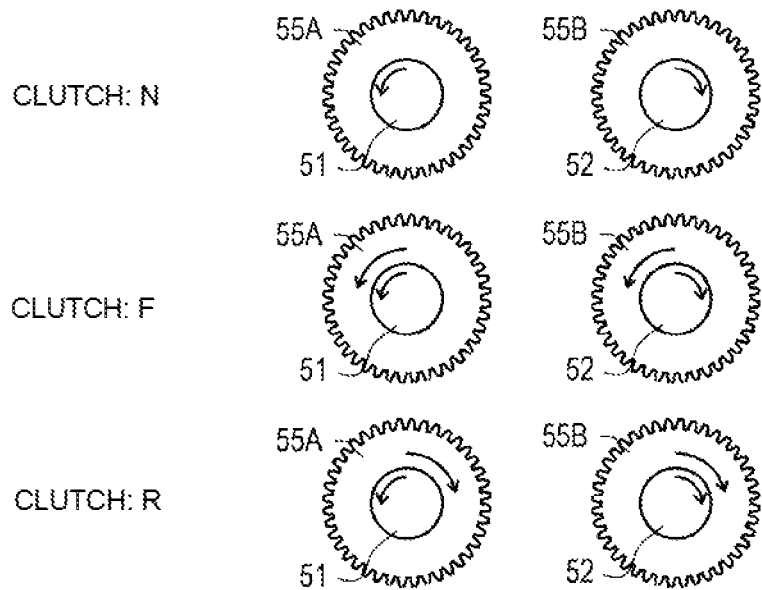
FIG. 10A illustrates whether or not the input shaft and its corresponding cylindrical gear and the reverse drive shaft and its corresponding cylindrical gear are rotated while the engine is driving as well as rotation directions thereof if they are rotated.
Figure 10B:
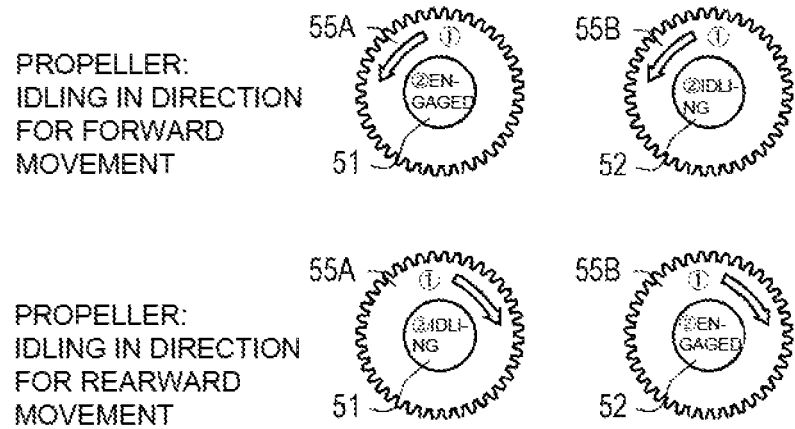
FIG. 10B illustrates whether or not the input shaft and its corresponding cylindrical gear and the reverse drive shaft and its corresponding cylindrical gear are rotated while the propeller is idling as well as rotation directions thereof if they are rotated.

As illustrated in FIGS. 10A and 10B, the gears (the cylindrical gear 55A, the cylindrical gear 55B) included in the gear mechanism 55 are respectively connected to the input shaft 51 and the reverse drive shaft 52 via one-way clutches 59A and 59B.

The one-way clutches 59A and 59B each have a substantially cylindrical shape. In addition, the one-way clutches 59A and 59B are respectively attached to the cylindrical gears 55A and 55B by being pressed thereinto. The one-way clutches 59A and 59B each have a center portion in its axial direction that functions as a clutch and both edges in the axial direction that function as bearings.

Each of the one-way clutches 59A and 59B is actuated in a case where its corresponding shaft or gear related to an output shaft 54 is rotated at a higher speed than a speed at which the shaft or gear related to the input shaft 51 is rotated. The actuation herein refers to a state in which the shaft or gear corresponding to the one-way clutch 59A or 59B and being related to the output shaft 54 becomes engageable (capable of power transmission) with the shaft or gear related to the input shaft 51. Each of the one-way clutches 59A and 59B is not actuated in a case where its corresponding shaft or gear related to the output shaft 54 is rotated at a lower speed than a speed at which the shaft or gear related to the input shaft 51 that is being driven by the engine 2 is rotated or in a case where its corresponding shaft or gear related to the output shaft 54 is rotated in a direction opposite to a direction in which the shaft or gear related to the input shaft 51 that is being driven by the engine 2 is rotated.

With reference to FIGS. 10A and 10B, the following will describe whether or not the input shaft 51, the cylindrical gear 55A, the reverse drive shaft 52, and the cylindrical gear 55B are rotated while the engine 2 is driving and the propeller 3 is idling as well as rotation directions thereof if they are rotated. FIGS. 10A and 10B schematically illustrate the input shaft 51, the cylindrical gear 55A, the reverse drive shaft 52, and the cylindrical gear 55B in a rear view.

In a state where the engine 2 is driving and the unit clutch 57 is not in a connected state, the unit clutch 57 does not transmit driving power to the cylindrical gear 55A. Consequently, the input shaft 51 is rotated in a direction (counterclockwise in FIGS. 10A and 10B) identical to that of the input shaft 51 that is being driven by the engine 2.

In a state where the engine 2 is driving and the unit clutch 58 is not in a connected state, the unit clutch 58 does not transmit driving power to the cylindrical gear 55B. Consequently, the reverse drive shaft 52 is rotated in a direction (clockwise in FIGS. 10A and 10B) identical to that of the reverse drive shaft 52 being driven by the engine 2.

In a state where the engine 2 is driving and the unit clutch 57 is in a connected state, the unit clutch 57 is connected to the cylindrical gear 55A. Along with rotation of the input shaft 51, the cylindrical gear 55A is rotated in a direction identical to a direction in which the input shaft 51 is rotated.

In a state where the engine 2 is driving and the unit clutch 58 is in a connected state, the unit clutch 58 is connected to the cylindrical gear 55B. Along with rotation of the reverse drive shaft 52, the cylindrical gear 55B is rotated in a direction identical to a direction in which the reverse drive shaft 52 is rotated.

The following will describe whether or not the input shaft 51 and the cylindrical gear 55A are rotated while the engine 2 is stopped and the propeller 3 is idling as well as rotation directions thereof if they are rotated.

While the engine 2 is stopped and the propeller 3 tends to be rotated in a direction for forward movement, the cylindrical gear 55A tends to be rotated counterclockwise via the output shaft 54. When the cylindrical gear 55A tends to be rotated counterclockwise, the one-way clutch 59A is actuated, so that the cylindrical gear 55A and the input shaft 51 are engaged with each other (become capable of transmitting power therebetween). This provides a state in which driving power can be transmitted from the engine 2 to the propeller 3 in an integrated manner. Thus, since the input shaft 51 is not rotated while the engine 2 is stopped, the propeller 3 is locked by a resistance force of the engine 2. Consequently, it is possible to prevent idling of the propeller 3.

While the engine 2 is stopped and the propeller 3 tends to be rotated in a direction for rearward movement, the cylindrical gear 55B tends to be rotated clockwise via the output shaft 54. When the cylindrical gear 55B tends to be rotated clockwise, the one-way clutch 59B is actuated, so that the cylindrical gear 55B and the reverse drive shaft 52 are engaged with each other (become capable of transmitting power therebetween). This provides a state in which driving power can be transmitted from the engine 2 to the propeller 3 in an integrated manner. Thus, since the reverse drive shaft 52 is not rotated while the engine 2 is stopped, the propeller 3 is locked by a resistance force of the engine 2. Consequently, it is possible to prevent idling of the propeller 3.

Even with the propulsion device configured to allow driving power to be transmitted from the input shaft 51 to the output shaft 54 via the cylindrical gears as those described above, it is possible to prevent idling of the propeller 3. This is because that this propulsion device includes the one-way clutches 59A and 59B each configured to be actuated in a case where its corresponding shaft or gear related to the output shaft 54 is rotated at a higher speed than a speed at which the shaft or gear related to the input shaft 51 is rotated, and consequently a state in which driving power can be transmitted from the engine 2 to the propeller 3 in an integrated manner can be achieved.

INDUSTRIAL APPLICABILITY

The present invention is applicable to propulsion devices for ships.

REFERENCE SIGNS LIST 1 propulsion device
11 input shaft
12 intermediate shaft
13 gear mechanism
13A forward gear
13B reverse gear
13C output gear
15 propeller shaft (output shaft)
17 unit clutch (forward and reverse switching clutch)
17A forward clutch
17B reverse clutch
18A forward one-way clutch
18B reverse one-way clutch

The invention claimed is:
1. A propulsion device for a ship, comprising:
an input shaft connected to a driving source;
a forward gear provided on the input shaft;
a reverse gear provided on the input shaft;
an output gear engaged with the forward gear and the reverse gear;
an output shaft configured to receive driving power transmitted from the output gear;
a forward and reverse switching clutch configured to transmit driving power from the input shaft to the forward gear or the reverse gear;
a forward one-way clutch disposed between the input shaft and the forward gear, the forward one-way clutch connecting the forward gear and the input shaft to each other in a case where the forward gear is rotated at a higher speed than a speed at which the input shaft is rotated; and
a reverse one-way clutch disposed between the input shaft and the reverse gear, the reverse one-way clutch connecting the reverse gear and the input shaft to each other in a case where the reverse gear is rotated at a higher speed than a speed at which the input shaft is rotated.

* * * * *